US008020468B2

(12) United States Patent
Yang (10) Patent No.: US 8,020,468 B2
(45) Date of Patent: Sep. 20, 2011

(54) BELT TENSION ADJUSTMENT APPARATUS AND ROBOT ARM HAVING THE SAME

(75) Inventor: Kum-Souck Yang, Gangwon-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 999 days.

(21) Appl. No.: 11/924,438

(22) Filed: Oct. 25, 2007

(65) Prior Publication Data

US 2008/0102999 A1    May 1, 2008

(30) Foreign Application Priority Data

Oct. 25, 2006  (KR) .................. 10-2006-0104120

(51) Int. Cl.
*B25J 17/00* (2006.01)
*F16H 7/08* (2006.01)
*F16H 7/12* (2006.01)

(52) U.S. Cl. ....... 74/490.04; 901/21; 474/109; 474/110; 474/136; 474/137

(58) Field of Classification Search .......... 474/109, 474/110, 114, 133, 134, 136, 137; 74/490.01, 74/490.03, 490.04; 901/21
See application file for complete search history.

(56) References Cited

U.S. PATENT DOCUMENTS

| | | | | |
|---|---|---|---|---|
| 1,570,591 A | * | 1/1926 | Mercer | 474/115 |
| 3,329,561 A | * | 7/1967 | Rojecki et al. | 162/273 |
| 4,411,182 A | * | 10/1983 | Borzym | 83/319 |
| 4,693,666 A | * | 9/1987 | Garin | 414/744.5 |
| 6,318,951 B1 | * | 11/2001 | Schmidt et al. | 414/744.5 |
| 6,609,985 B2 | * | 8/2003 | Todd et al. | 474/109 |
| 2005/0113197 A1 | * | 5/2005 | Pong | 474/117 |
| 2005/0282668 A1 | * | 12/2005 | Ali et al. | 474/101 |
| 2006/0183585 A1 | * | 8/2006 | Fairchild | 474/101 |

FOREIGN PATENT DOCUMENTS

| | | |
|---|---|---|
| FR | 2705750 A1 * | 12/1994 |
| JP | 62278352 A * | 12/1987 |
| JP | 63172052 A * | 7/1988 |
| JP | 2000-183125 | 6/2000 |
| KR | 1996-0029664 | 8/1996 |
| KR | 1996-0009743 | 11/1996 |
| KR | 20-0119135 | 3/1998 |

(Continued)

OTHER PUBLICATIONS

English language abstract of Korean Publication No. 1999-023258 in the form of corresponding U.S. Patent No. 6,151,924. English language abstract of Japanese Publication No. 2000-183125.
English language abstract of Korean Publication No. 10-2005-0038429.
English language abstract of Korean Publication No. 10-2005-0089653.

*Primary Examiner* — Thomas R Hannon
*Assistant Examiner* — Alan Waits
(74) *Attorney, Agent, or Firm* — Volentine & Whitt, PLLC (57) ABSTRACT

A belt tension adjustment apparatus and a robot arm having the belt tension adjustment apparatus are disclosed. The belt tension adjustment apparatus includes a tension measurement part for measuring tension of a belt running on an endless track, a tension adjustment part for pressing the belt in a direction inclined with respect to a surface of the belt to apply a pressing force to the belt, and a controller for controlling the tension adjustment part depending on the measured tension. The belt tension adjustment apparatus prevents variation of a running speed of the belt and maintains tension of the belt.

14 Claims, 7 Drawing Sheets

FOREIGN PATENT DOCUMENTS

| | | |
|---|---|---|
| KR | 20-0131993 | 9/1998 |
| KR | 1999-023258 | 3/1999 |
| KR | 1999-013570 | 4/1999 |
| KR | 1999-0026133 | 7/1999 |
| KR | 10-0246789 | 12/1999 |
| KR | 2000-0031242 | 6/2000 |
| KR | 2000-0048000 | 7/2000 |
| KR | 2000-0020762 | 12/2000 |
| KR | 2001-0074695 | 8/2001 |
| KR | 10-2004-0015536 | 2/2004 |
| KR | 10-2005-0038429 | 4/2005 |
| KR | 10-2005-0089653 | 9/2005 |

* cited by examiner

BELT TENSION ADJUSTMENT APPARATUS AND ROBOT ARM HAVING THE SAME

CROSS-REFERENCE TO RELATED APPLICATION

This application claims the benefit of Korean Patent Application No. 2006-104120, filed Oct. 25, 2006, the disclosure of which is hereby incorporated by reference in its entirety.

BACKGROUND OF THE INVENTION

1. Field of the Invention

The present invention relates to a belt tension adjustment apparatus and a robot arm having the same, and more particularly, to a belt tension adjustment apparatus and a robot arm having the same capable of precisely adjusting a moving position of the robot arm to convey a wafer to a normal position.

2. Description of the Related Art

In order to manufacture a semiconductor device, various chemical and physical processes are performed using various processing apparatuses. In addition, a wafer-conveyance process is required in order to perform a unit process in the processing apparatus.

A conveyance apparatus used in the wafer-conveyance process includes various motors, gears, belts, and so on. Typically, a belt may be driven by a motor to drive an arm on a wafer loader and a reticle loader to smoothly use power and perform precise operation. While it may depend on materials and the purposes of use, the belt may deteriorate and loosen over time, resulting in reduced elasticity.

Generally, a power transmission belt is wound on a drive pulley and a driven pulley of a driven shaft. A belt connector securely connects the power transmission belt, and the power transmission belt has an arm drive part for driving an arm.

The power transmission belt is driven by rotation of the drive pulley. In order to receive uniform rotational power from the drive pulley without any loss, the belt should maintain a uniform tension between the drive pulley and the driven pulley. When the power transmission belt maintains uniform tension, the arm drive part can straightly move with uniform speed and acceleration.

However, when the power transmission belt is used for a long time, the power transmission belt deteriorates and loosens, thereby generating sagging. As a result, the power transmission belt moves in a serpentine manner between the drive and driven pulleys, Therefore, it is difficult to smoothly transmit rotational power from the drive pulley to the arm drive part. As a result, the arm drive part, which is used as a wafer loader or a reticle loader, cannot be precisely positioned, and thus generates many errors. It is even worse when the power transmission belt may be separated from the belt pulleys to stop the operation. While an operator may appropriately stop the operation and replace the belt, it is difficult to estimate an exchange cycle of the belt, since the exchange cycle of the belt may vary depending on equipment and use environment of the drive part. Additionally, loss may be generated due to incorrect exchange.

SUMMARY OF THE INVENTION

An embodiment of the invention provides a belt tension adjustment apparatus and a robot arm having the same capable of maintaining uniform tension of a belt running on an endless track.

Another embodiment of the invention provides a belt tension adjustment apparatus and a robot arm having the same capable of precisely conveying a wafer to a desired position.

Still another embodiment of the invention provides a belt tension adjustment apparatus, and a robot arm having the same, capable of preventing process error when the belt for moving the robot arm is abnormally driven, thereby maintaining uniform tension of the belt and conveying a wafer to a normal position.

In one aspect, a belt tension adjustment apparatus is provided. The belt tension adjustment apparatus includes a tension measurement part for measuring tension of a belt running on an endless track, a tension adjustment part for pressing the belt in a direction inclined with respect to a surface of the belt to apply a pressing force to the belt, and a controller for controlling the tension adjustment part depending on the measured tension.

In this process, the controller may receive the measured tension from the tension measurement part, pre-set a standard tension, and adjust the pressing force until the measured tension is equal to the standard tension. The tension measurement part may measure a frequency of a surface of the belt to calculate the tension.

Further, the body may include a sliding hole inclined with respect to a surface of the belt. The tension adjustment part may include a guide having a rotary shaft, and inserted into the sliding hole, and sliding along the surface of the belt in an inclined manner; a roller inserted into the rotary shaft to be rotated, and in contact with the surface; and a pressing means connected to the guide, and receiving an electrical signal from the controller to sequentially press the guide.

Furthermore, the tension adjustment part may be disposed at a plurality of positions in an alternate manner with the belt interposed therebetween. In addition, the controller may selectively control the plurality of tension adjustment parts. Further, the roller may be meshed with the surface of the belt.

Furthermore, the rotary shaft may further include a rotary motor for rotating the roller, wherein the rotary motor may receive a running speed of the belt from the controller to drive the roller at the same speed as the running speed.

In addition, the pressing means may include a stepping motor, and a shaft installed at the stepping motor and extendably connected to an upper part of the guide at one end.

In another aspect, a robot arm is provided. The robot arm includes a body having a specific length; pulleys disposed on the body and spaced apart from each other; a belt mounted on the pulleys and running on an endless track; a tension measurement part mounted on the body and measuring tension of the belt; a tension adjustment part mounted on the body and pressing the belt in a direction inclined with respect to a surface of the belt to apply a pressing force to the belt; and a controller for controlling the tension adjustment part depending on the measured tension.

In this process, the controller storing a pre-set standard tension may receive the measured tension and adjust the pressing force until the measured tension is equal to the standard tension.

In addition, the tension measurement part may measure a frequency of a surface of the belt to calculate the tension.

Further, the body may include a sliding hole inclined with respect to a surface of the belt. The tension adjustment part may include a guide having a rotary shaft, and inserted into the sliding hole, and sliding along the surface of the belt in an inclined manner; a roller inserted into the rotary shaft to be rotated, and in contact with the surface; and a pressing means connected to the guide, and receiving an electrical signal from the controller to sequentially press the guide.

Furthermore, the tension adjustment part may be disposed at a plurality of positions in an alternate manner with the belt interposed therebetween.

In addition, the controller may selectively control the plurality of tension adjustment parts. Further, the roller may be meshed with the surface of the belt.

Furthermore, the rotary shaft may further include a rotary motor for rotating the roller, wherein the rotary motor may receive a running speed of the belt from the controller to drive the roller at the same speed as the running speed.

In addition, the pressing means may include a stepping motor, and a shaft installed at the stepping motor and extendably connected to an upper part of the guide at one end.

BRIEF DESCRIPTION OF THE DRAWINGS

The foregoing and other objects, features and advantages of the invention will be apparent from the more particular description of a preferred embodiment of the invention, as illustrated in the accompanying drawing. The drawing is not necessarily to scale, emphasis instead being placed upon illustrating the principles of the invention.

DETAILED DESCRIPTION OF THE INVENTION

A belt tension adjustment apparatus and a robot arm having the same in accordance with an exemplary embodiment of the present invention will be described in detail with reference to the accompanying drawings. In addition, an embodiment of the belt tension adjustment apparatus will be described together with the description of the robot arm, without separately describing the belt tension adjustment apparatus.

Figure 1:
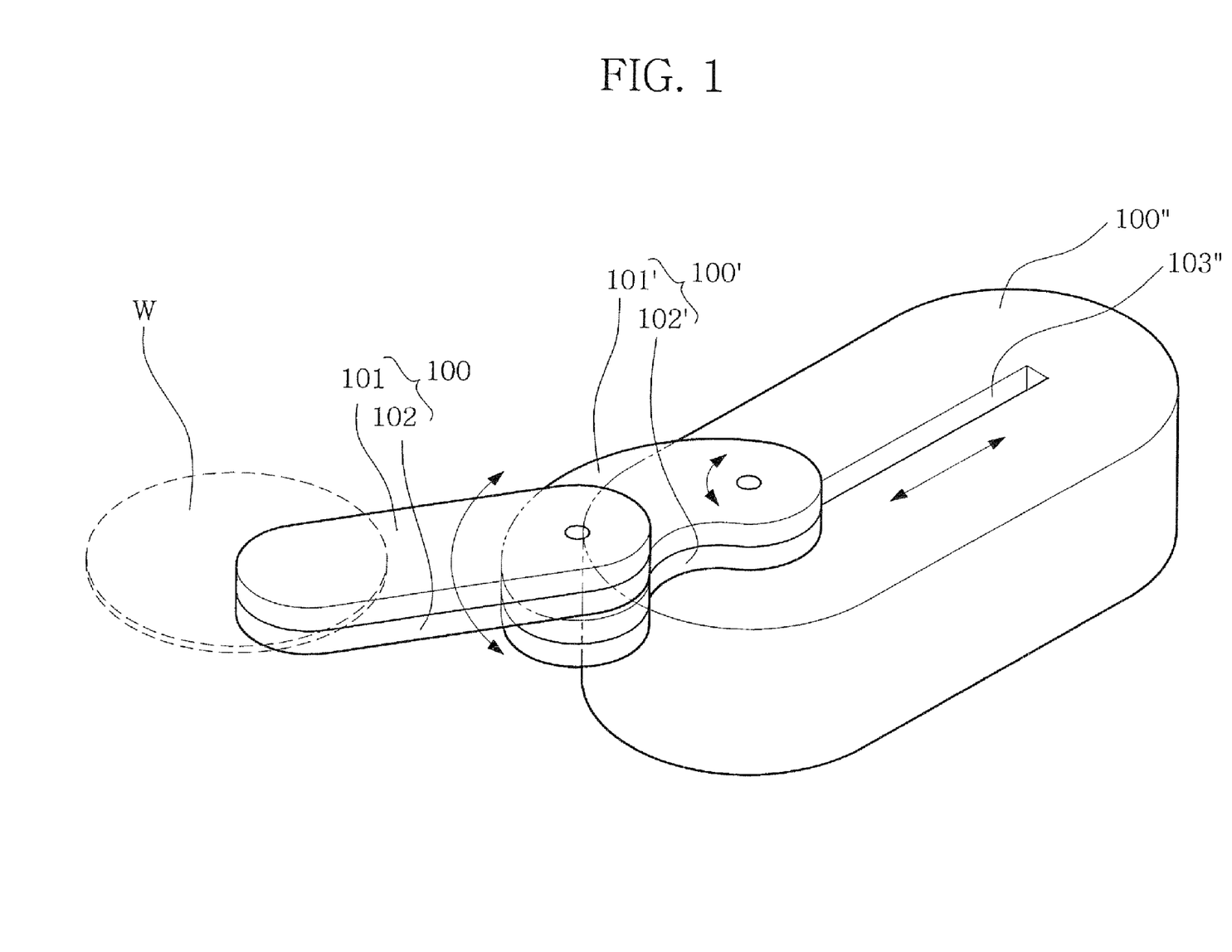
FIG. 1 is a perspective view of a robot arm having a belt tension adjustment apparatus in accordance with an exemplary embodiment of the present invention.
Figure 2:
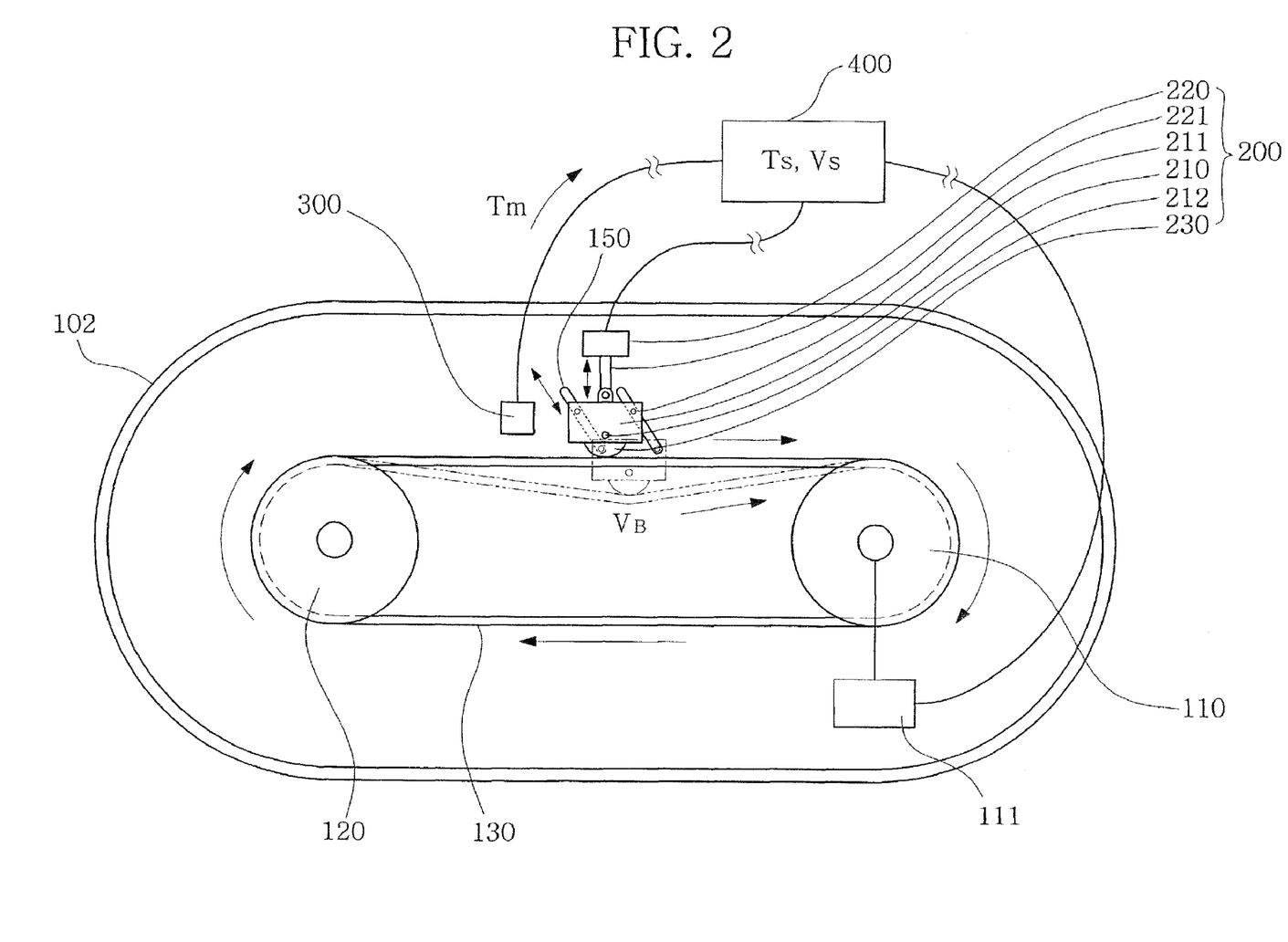
FIG. 2 is a plan view of a belt tension adjustment apparatus and a robot arm having the same in accordance with an exemplary embodiment of the present invention.

FIG. 1 is a perspective view of a robot arm having a belt tension adjustment apparatus in accordance with an exemplary embodiment of the present invention, and FIG. 2 is a plan view of a belt tension adjustment apparatus and a robot arm having the same in accordance with an exemplary embodiment of the present invention.

Referring to FIGS. 1 and 2, a robot arm having a belt tension adjustment apparatus in accordance with the present invention includes a body having a specific length. The body includes a first body 100, a second body 100' hinged to one end of the first body 100, and a third body 100" hinged to one end of the second body 100' and straightly reciprocating the second body 100'. The first body includes an upper body 101 and a lower body 102, coupled to each other.

Referring to FIG. 2, the lower body 102 has a pair of pulleys 110 and 120 spaced apart from each other. One of the pulleys 110 and 120 is a drive pulley, e.g., pulley 110, to be rotated by some external transmission means, and the other is a driven pulley, e.g., pulley 120. For example, the drive pulley 110 is connected to a drive motor 111 to receive a driving force. In addition, a belt 130 is mounted on the pair of pulleys 110 and 120 to run on an endless track with a uniform speed by driving the drive pulley 110.

The lower body 102 includes a tension measurement part 300 disposed adjacent to a surface of the belt 130, i.e., a running surface of the belt 130, and electrically connected to a controller 400. The tension measurement part 300 measures tension of the running belt 130. The tension measurement part 300 may be a vibration measurement device to measure a frequency of the running belt 130. The measured tension may be related to the frequency. For example, the frequency may be in proportion to the tension of the belt 130.

In addition, the tension measurement part 300 may be a distance detector for measuring a distance from a running surface of the running belt 130 to the tension measurement part 300 in real time.

The controller 400 can receive the measured tension Tm from the tension measurement part 300. A pre-set standard tension Ts of the belt 130 may be stored in the controller 400.

Figure 3:
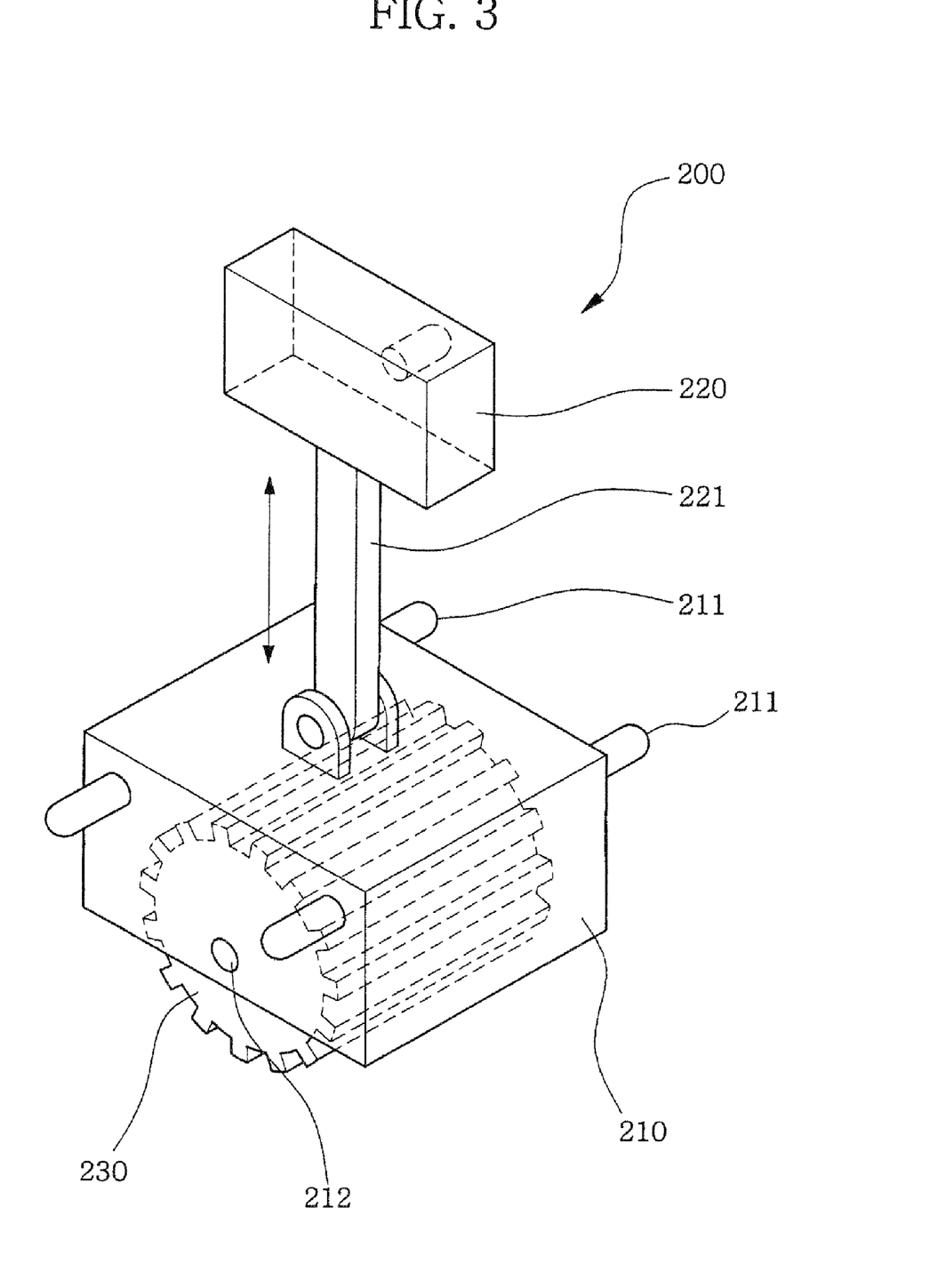
FIG. 3 is a perspective view of a tension adjustment part in accordance with an exemplary embodiment of the present invention.

In addition, the lower body 102 includes a tension adjustment part 200 for sequentially pressing the running surface of the belt 130 in a direction inclined with respect to the running surface until the measured tension Tm of the belt 130 is equal to the standard tension Ts. As shown in FIGS. 2 and 3, the tension adjustment part 200 includes sliding projections 211 projecting from both sides thereof, and a guide 210 having a rotary shaft 212 at its center. A roller 230, e.g., an idle roller, is installed at the rotary shaft 212 of the guide 210. In addition, the guide 210 is connected to a pressing means. The pressing means includes a stepping motor 220 and a shaft 221 extendably connected to the stepping motor 220. One end of the shaft 221 is hinged to an upper part of the guide 210. The pressing means may be a hydraulic or pneumatic cylinder.

The sliding projections 211 projecting from both sides of the guide 210 are inserted into a sliding hole 150 formed at the lower body 102, so as to slide along the sliding hole 150. The sliding hole 150 is inclined with respect to a running surface along a running direction of the belt 130 by a specific angle. Therefore, the guide 210 may slide along the sliding hole 150 in an inclined direction relative to the running surface along a running direction of the belt 130.

Figure 4:
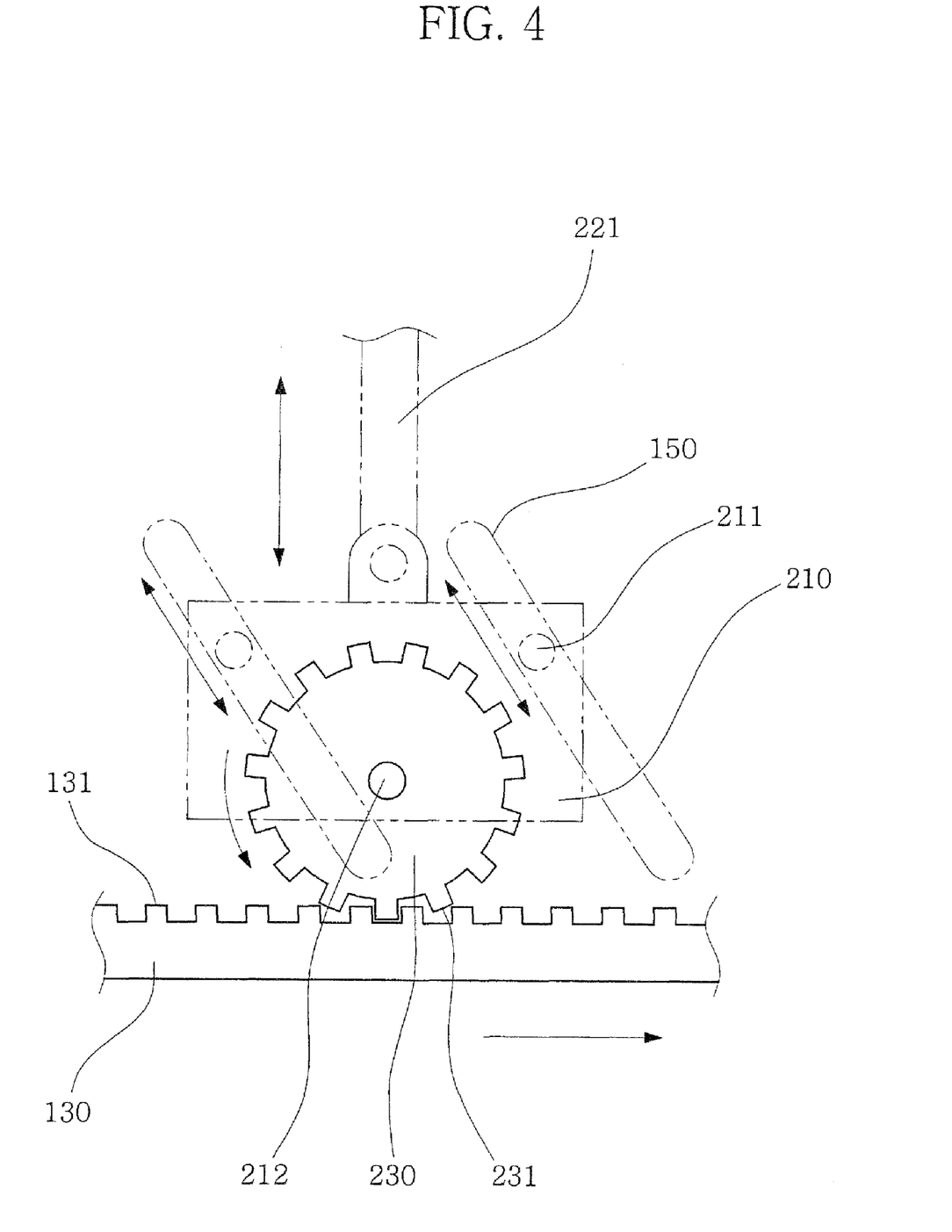
FIG. 4 is a partial cross-sectional view showing a meshed connection between the roller and belt shown in FIG. 2.

FIG. 4 is a partial cross-sectional view showing a meshed connection between a roller of a guide and the belt of FIG. 2 in accordance with an exemplary embodiment of the present invention.

Referring to FIG. 4, teeth 231 and 131 are formed at an outer periphery of the roller 230 and the running surface of the belt 130, such that the outer periphery of the roller 230 are meshed with the running surface of the belt 130 through the teeth 231 and 131.

Figure 5:
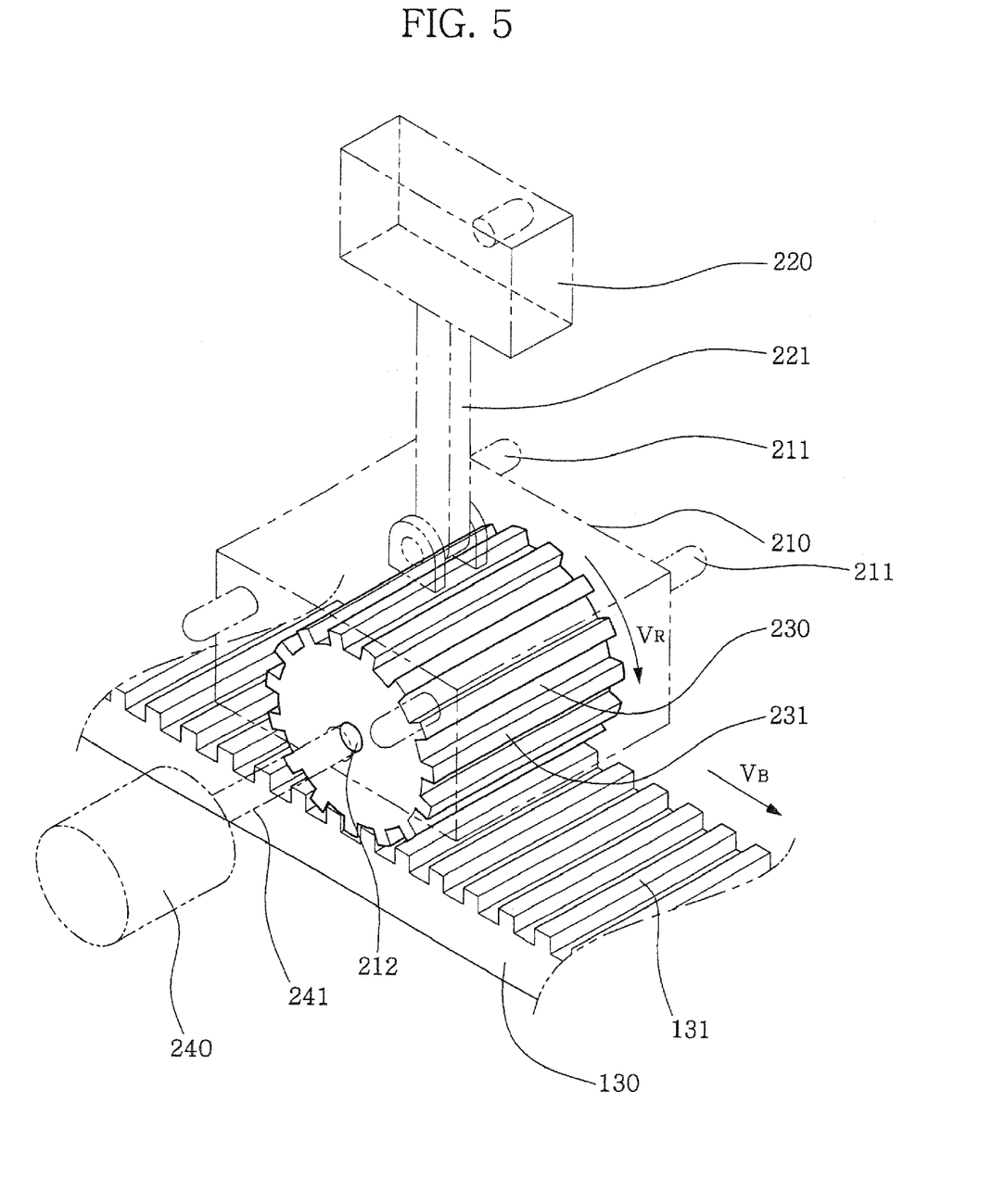
FIG. 5 is a perspective view of a tension adjustment part in accordance with an exemplary embodiment of the present invention, in which a rotary motor is further installed at a roller.

In addition, as shown in FIG. 5, a rotary motor 240 may be installed at the rotary shaft 212 formed at the guide 210. In this process, a motor shaft 241 extends from the rotary motor 240 to be integrally connected to the rotary shaft 212. Therefore, the roller 230 is rotated when the rotary motor 240 is driven. In addition, the rotary motor 240 is electrically connected to the controller 400 and controlled by the controller 400. A standard velocity Vs of the belt 130 may be pre-set in the controller 400. The controller 400 is also electrically connected to a drive motor 111 to receive a running velocity Vb of the belt 130 from the drive motor 111 in real time. The drive motor is connected to the drive pulley 110 for driving the belt 130.

The following describes operation of a belt tension adjustment apparatus in accordance with an exemplary embodiment of the present invention with reference to FIGS. 2 to 4.

Referring to FIG. 2, a belt 130 is mounted on a drive pulley 110 and a driven pulley 120 installed at opposite ends of a lower body 102 to run on an endless track. A tension measurement part 300 is installed at the lower body 102 and measures tension of a running surface of the running belt 130, and transmits the measured tension Tm to a controller 400.

The tension measurement part 300 may be a vibration measurement device to measure a frequency of the running surface of the running belt 130. Therefore, the tension Tm transmitted to the controller 400 may be a frequency value. The measured frequency may be proportional to the tension of the belt 30. In addition, the tension measurement part 300 may be a distance detector comprising a signal transmission part and a signal reception part. A signal transmitted from the signal transmission part is reflected by the belt surface and received into the signal reception part. As such, a distance from the tension measurement part 300 to the running surface of the running belt 130 is calculated. The tension Tm may be related to a distance between the distance detector (i.e., the tension measurement part 300) and the running surface of the belt 130. When the tension is calculated using the distance value, a standard distance between the running surface of the belt and the distance detector is pre-set in the controller 400. The standard distance may be related to a standard tension Ts.

Therefore, the standard tension Ts pre-set in the controller 400 may be related to a frequency or distance depending on whether the tension measurement part 300 operates as the vibration measurement part or the distance detector.

The tension Tm measured by the tension measurement part 300 is transmitted to the controller 400. The controller 400 compares whether the tension Tm is different from the standard tension Ts. When the measured tension Tm is smaller than the standard tension Ts, a stepping motor 220 is driven to press the running surface of the belt 130 until the tension Tm is equal to the standard tension Ts. Specifically, when a drive signal is transmitted from the controller 400, the extendable shaft 221 extends. Therefore, a guide 210 hinged to one end of the extendable shaft 221 is slid downward. Additionally, since the sliding hole 150 is inclined with respect to the running surface of the belt 130 in a running direction of the belt 130 by a specific angle, the guide 210 moves as sliding projections 211 projecting from both sides of the guide 210 move along an inclined path of the sliding hole 150 formed at the lower body 102. Therefore, the guide 210 slides along the sliding hole 150 in an inclined manner.

A roller 230 installed at the rotary shaft 212 of the guide 210 can sequentially press the running surface of the belt 130 in an inclined manner to adjust the tension Tm of the belt 130. Specifically, since the roller 230 presses the running surface of the belt 130 in a running direction of the belt 130 in an inclined manner as the guide 210 moves along the inclined path, it is thus possible to reduce the friction force generated when the running surface is pressed as compared to the case that the roller 230 presses the belt 130 in a direction perpendicular to the running surface. When the roller 230 is an idle roller, a friction force between an outer periphery of the roller 230 and the running surface of the belt 130 can be reduced.

Further, since the running surface of the belt 130 is in direct contact with the roller 230 when adjusting tension of the belt 130, it is possible to prevent variation of a running speed VB of the running belt 130. As a result, it is possible to prevent variation of a moving position of the robot arm when adjusting the tension of the belt 130. Meanwhile, as shown in FIG. 4, when the roller is meshed with the running surface of the belt 130 through teeth 131 and 231, it is possible to prevent slippage between the running surface of the belt 130 and the outer periphery of the roller 230 when the roller 230 moves downward to press the running surface of the belt 130.

Referring to FIG. 5, a rotary motor 240 may be further installed at the roller 230 of the tension adjustment part 200 in accordance with the present invention. A drive motor 111 (see FIG. 2) transmits a running speed VB of the belt 130 to the controller 400. When the running speed VB of the belt 130 is different from a standard running speed Vs, the controller 400 drives the rotary motor 240 such that the running speed VB of the belt 130 is equal to the standard running speed Vs. The rotary motor 240 drives the roller 230 with a specific speed VR to vary the running speed of the belt 130 as the belt 130 receives a driving force from the roller 230. When the running speed VB of the belt 130 is equal to the standard running velocity Vs, the controller 400 stops driving of the rotary motor 240 to maintain an idle state thereof.

For example, when the roller 230 presses the running surface of the belt 130 to vary tension Tm of the belt 130 to maintain a uniform tension, the running speed VB of the belt 130 may be varied due to fault of the drive motor 111. In this case, a moving position of the robot arm is inaccurate such that a wafer W cannot be conveyed to a desired position, thereby generating a process error. In order to prevent the process error, the controller 400 drives the rotary motor 240 to rotate the roller 230. Since the roller 230 meshes with the running surface of the belt 130 through teeth 131 and 231, the belt 130 is forcedly driven by the roller 230 such that the pre-set standard running speed Vs of the belt 130 is maintained. As a result, the belt 130 can maintain the pre-set standard running speed Vs, and equipment maintenance can be performed after conveying the wafer W to a desired position.

Hereinafter, a belt tension adjustment apparatus and a robot arm having the same in accordance with another exemplary embodiment of the present invention will be described.

Figure 6A:
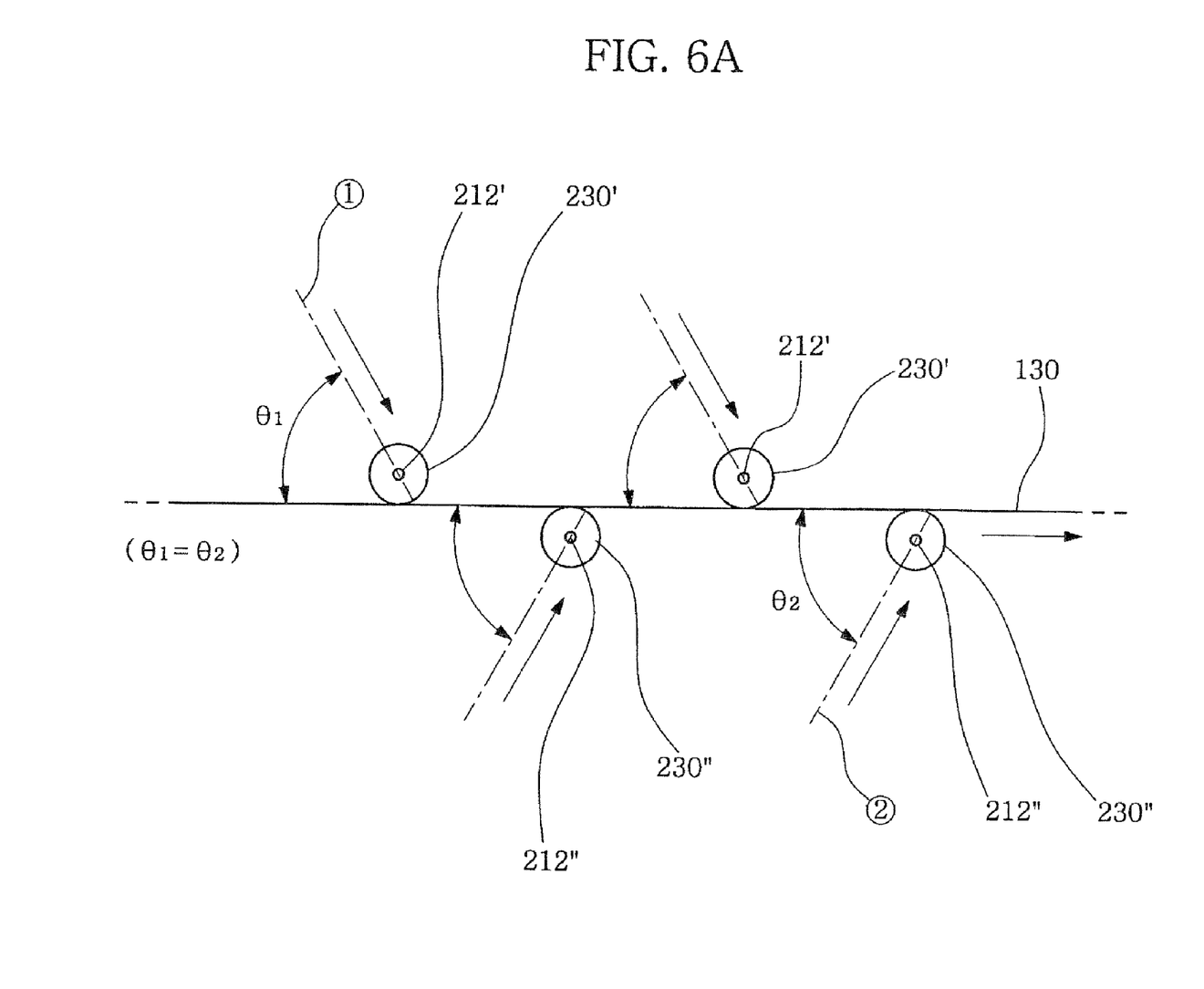
FIGS. 6A and 6B are schematic views of a belt tension adjustment apparatus and a robot arm having the same in accordance with another exemplary embodiment of the present invention.
Figure 6B:
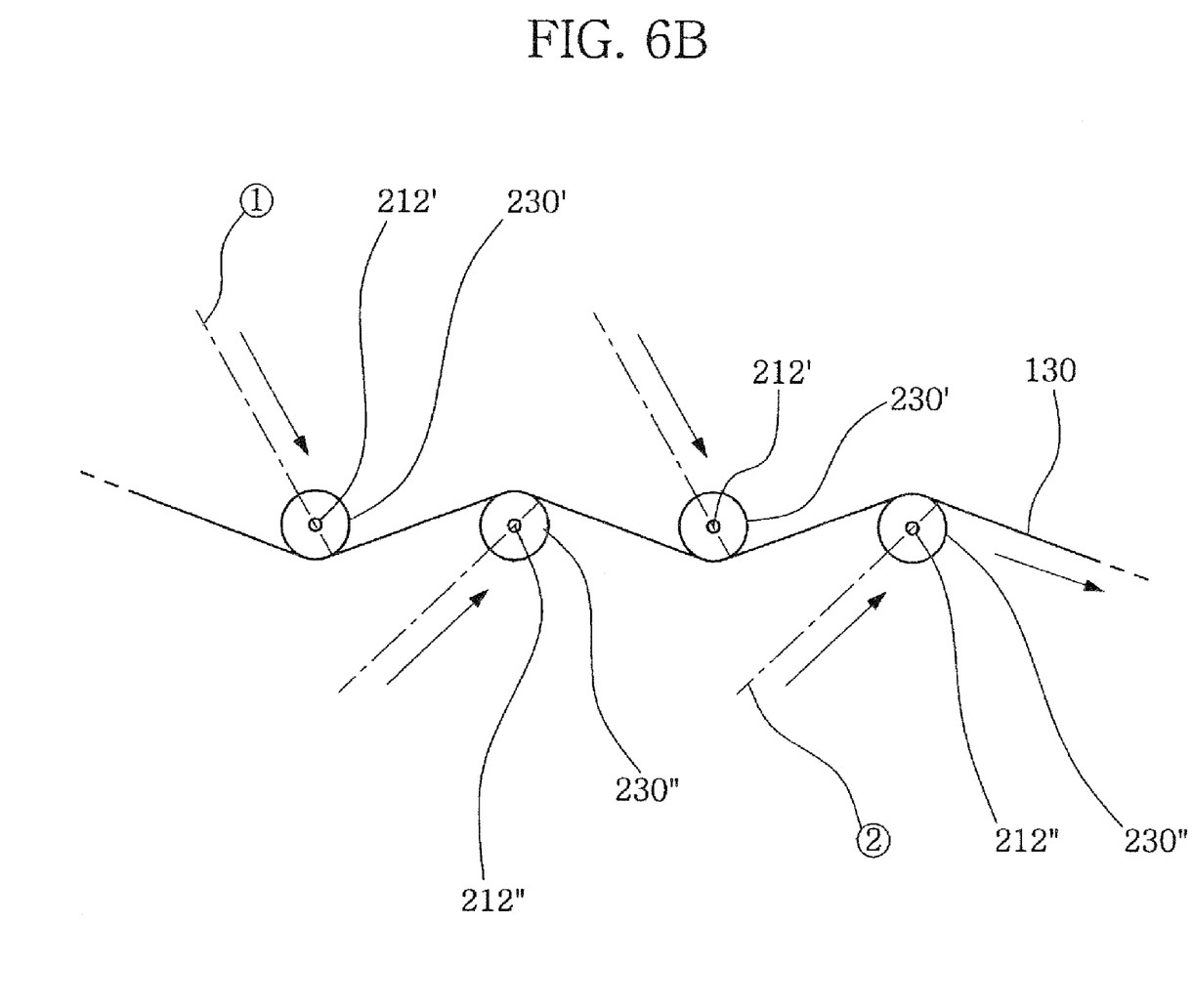

FIGS. 6A and 6B are cross-sectional views of a belt tension adjustment apparatus and a robot arm having the same in accordance with another exemplary embodiment of the present invention.

A tension adjustment part of another exemplary embodiment of the present invention is similar to the tension adjustment part 200 shown in FIGS. 2 and 3. Therefore, only certain components of the tension adjustment part 200 will be described.

The tension adjustment part 200 in accordance with another exemplary embodiment of the present invention includes a plurality of rollers disposed at predetermined intervals in an alternate manner with the running surface of the belt 130 interposed therebetween. That is, the rollers may be disposed in a zigzag manner with the belt 130 interposed therebetween. In this process, the rollers are divided into upper rollers 230' and lower rollers 230" through the medium of the belt 130.

Specifically, as shown in FIG. 6A, the upper rollers 230 and lower rollers 230" are disposed through the medium of the running surface of the belt 130. The upper rollers 230' slide along a first inclined axis 1 and the lower rollers 230" slide along a second inclined axis 2. A first angle Θ1 between the first inclined axis 1 and the running surface of the belt 130 may be equal to a second angle Θ2 between the second inclined axis 2 and the running surface of the belt 130.

The rollers 230' and 230" slide when sliding projections 211 of guides 210 are inserted into a sliding hole 150 formed at a lower body 120 and slide, similar to FIG. 2. In this process, although the sliding hole 150 is not shown, there may be a plurality of sliding holes divided into upper sliding holes formed along the first inclined axis 1 and lower sliding holes formed along the second inclined axis 2, both of which are formed at the lower body 102.

In addition, the tension measurement part 300 is installed at the lower body 102 and disposed adjacent to upper and lower running surfaces of the belt 130. In this process, since the constitution of the tension measurement part 300 is similar to the embodiment with reference to FIG. 2, the tension measurement part 300 will not be repeated.

Further, although it is not shown in FIGS. 6A and 6B, there may be upper and lower guides for rotatably supporting the upper and lower rollers. Upper and lower sliding projections formed at the upper and lower guides may have the same constitution as the guide 210 and the sliding projection 211 of the embodiment with reference to FIG. 2. In addition, the upper and lower sliding projections are inserted into the sliding holes 150 as shown in the embodiment with reference to FIG. 2. The upper parts of the upper and lower guides are hinged to the pressing means as shown in the embodiment with reference to FIG. 3. Specifically, each of the upper parts of the upper and lower guides is hinged to a corresponding stepping motor 220. The stepping motor 220 is electrically connected to the controller 400.

In this process, constitution and operation of the controller 400 is partially similar to the embodiment. In another respect, the controller 400 is electrically connected to the tension measurement parts 300, and an average tension Tav is calculated from tensions Tm transmitted from the tension measurement parts 300. In addition, the controller 400 may selectively drive the stepping motors.

Hereinafter, an example operation of the robot arm in accordance with another exemplary embodiment of the present invention will be described with reference to the above constitution.

The tension measurement parts 300 measure tensions Tm of the running surface of the running belt 130 to transmit them to the controller 400. The controller 400 calculates an average tension Tav from the tensions Tm and compares the average tension Tav with the standard tension Ts. If the average tension Tav is different from the standard tension Ts, the controller 400 drives the stepping motors until the average tension Tac is equal to the standard tension Ts. At this time, the controller 400 may selectively drive the stepping motors.

As shown in FIG. 6B, the upper and lower rollers 230' and 230" move along the first and second inclined axis 1 and 2 by the stepping motors. The moving upper and lower rollers 230' and 230" press the upper and lower running surfaces of the belt 130, respectively. Since the rollers 230' and 230" press the running surface of the running belt 130 at its upper and lower sides at predetermined intervals, the stepping motors are driven less than the stepping motor shown in FIG. 2, it is thus possible to approximate the average tension Tav to the standard tension Ts set in the controller 400.

In addition, since the controller 400 may selectively drive the stepping motors, any one stepping motor is malfunctioned, it is possible to maintain uniform tension of the belt 130, and prevent the robot arm from being moved to an undesired position or a wafer from being conveyed to an abnormal position due to the malfunction of the stepping motor.

Further, the rollers 230' and 230" may be meshed with the running surface of the belt 130 as shown in FIG. 4. The rollers 230' and 230" may also be connected to the rotary motor 240 to be forcedly driven as shown in FIG. 5. The forcedly driven constitution is similar to the embodiment with reference to FIG. 5, thus the details will not be repeated.

As can be seen from the foregoing, a belt tension adjustment apparatus in accordance with the present invention maintains tension of a running surface of a belt at a pre-set tension by driving a roller to press the running surface of the belt in a direction inclined with respect to a running direction of the belt. As a result, it is possible to reduce or even minimize the friction force between the roller and the running surface of the belt to prevent variation of a running speed of the belt, and maintain tension of the belt.

In addition, the roller is meshed with the running surface of the belt, and a separate rotary motor is installed at the roller. As a result, when a running speed of the belt is different from a standard running speed, the rotary motor drives the roller to maintain the running speed of the belt such that process errors due to abnormal driving of the belt can be prevented.

Further, a plurality of tension measurement parts and tension adjustment parts are installed at upper and lower running surfaces of the belt. Therefore, even when any tension adjustment part malfunctions, it is possible to maintain uniform tension of the belt using another tension adjustment part.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A robot arm comprising:
   an arm member of a specific length;
   pulleys disposed on the arm member and spaced apart from each other;
   an endless belt mounted on the pulleys;
   a belt tension sensor mounted on the arm member and facing the belt at a first location in the robot arm and operative to generate a signal representative of the tension of the belt;
   at least one tension adjustor mounted to the arm member and including a roller disposed in contact with a run of the belt at a respective location, spaced along the belt from the first location, the roller for pressing the belt to tension the belt, and a drive mechanism operatively connected to the roller so as to move the roller in a direction inclined with respect to the longitudinal direction of said run of the belt to thereby change the tension of the belt; and
   a controller operatively connected to the sensor and to the drive mechanism of the tension adjustor so as to receive the signal generated by the sensor as a measure of the tension of the belt, and control the drive mechanism of the tension adjustor responsive to the measured tension,
   wherein the arm member has a slot therein elongated in said direction inclined with respect to the longitudinal direction of said run of the belt, and
   wherein the drive mechanism of the tension adjustor includes a guide having a rotary shaft and received in the slot in said arm member such that the guide is slidable back and forth in the inclined direction relative to said run of the belt,
   wherein the roller is supported by the rotary shaft so as to be rotatable,
   wherein the robot arm includes a drive motor connected to one of the pulleys so as to rotate said one of the pulleys and thereby drive the belt, and
   wherein the drive motor is operative to output a signal indicative of a running speed at which the belt is driven by the drive motor, the tension adjustor also includes a rotary motor connected to the roller so as to rotate the roller, the controller is operatively connected to the drive motor so as to receive the signal output by the drive motor, and the controller is operatively connected to the rotary motor so as to control the rotary motor to rotate the roller at a rate based on the running speed.

2. The robot arm according to claim 1, wherein the controller has data of a pre-set standard tension stored therein, the controller is configured to control the drive mechanism of the tension adjustor until the measured tension is equal to the pre-set standard tension.

3. The robot arm according to claim 1, wherein the sensor is a vibration sensor that senses the frequency of vibrations of the belt at said first location.

4. The robot arm according to claim 1, wherein the at least one tension adjustor includes a plurality of rollers contacting the belt at a plurality of positions, respectively, and alternately disposed on opposite sides of the belt in the longitudinal direction of said run of the belt such that the belt is interposed between the rollers of the tension adjustor.

5. The robot arm according to claim 4, wherein the at least one tension adjustor comprises a plurality of the tension adjustors, and the controller is operative to selectively control the drive mechanisms of the tension adjustors.

6. The robot arm according to claim 1, wherein the belt has teeth, and the roller is a toothed roller and meshes with the belt.

7. The robot arm according to claim 1, wherein the tension adjustor also includes:
   a stepping motor; and
   a shaft connecting the stepping motor and the guide.

8. A belt tension adjustment apparatus comprising:
   an endless belt, and pulleys around which the belt is received;
   a belt tension sensor facing the belt at a first location in the apparatus and operative to generate a signal representative of the tension of the belt;
   at least one tension adjustor including a roller disposed in contact with a run of the belt at a respective location, spaced along the belt from the first location, the roller for pressing the belt to tension the belt, and a drive mechanism operatively connected to the roller so as to move the roller in a direction inclined with respect to a longitudinal direction of said run of the belt to thereby change the tension of the belt;
   a controller operatively connected to the sensor and to the drive mechanism of the tension adjustor so as to receive the signal generated by the sensor as a measure of the tension of the belt, and control the drive mechanism of the tension adjustor responsive to the measured tension; and
   a body supporting the belt, and having a slot therein elongated in said direction inclined with respect to the longitudinal direction of said run of the belt,
   wherein the drive mechanism of the tension adjustor includes a guide having a rotary shaft, the guide received in the slot in said body such that the guide is slidable back and forth in the inclined direction relative to said run of the belt,
   wherein the roller is supported by the rotary shaft so as to be rotatable,
   wherein belt tension adjustment apparatus further comprising a drive motor connected to one of the pulleys so as to rotate said one of the pulleys and thereby drive the belt, and wherein the drive motor is operative to output a signal indicative of a running speed at which the belt is driven by the drive motor, and
   wherein the tension adjustor also includes a rotary motor connected to the roller so as to rotate the roller, the controller is operatively connected to the drive motor so as to receive the signal output by the drive motor, and the controller is operatively connected to the rotary motor so as to control the rotary motor to rotate the roller at a rate based on the running speed.

9. The belt tension adjustment apparatus according to claim 8, wherein the controller has data of a pre-set standard tension stored therein, and the controller is configured to control the drive mechanism of the tension adjustor until the measured tension is equal to the pre-set standard tension.

10. The belt tension adjustment apparatus according to claim 8, wherein the sensor is a vibration sensor that senses the frequency of vibrations of the belt at said first location.

11. The belt tension adjustment apparatus according to claim 8, wherein the at least one tension adjustor includes a plurality of rollers contacting the belt at a plurality of positions, respectively, and alternately disposed on opposite sides of the belt in the longitudinal direction of said run of the belt such that the belt is interposed between the rollers of the tension adjustor.

12. The belt tension adjustment apparatus according to claim 11, wherein the at least one tension adjustor comprises a plurality of the tension adjustors, and the controller is operative to selectively control the drive mechanisms of the tension adjustors.

13. The belt tension adjustment apparatus according to claim 8, wherein the belt has teeth, and the roller is a toothed roller and meshes with the belt.

14. The belt tension adjustment apparatus according to claim 8, wherein the tension adjustor also includes:
   a stepping motor; and
   a shaft connecting the stepping motor and the guide.

* * * * *